(12) United States Patent
Collignon et al.

(10) Patent No.: US 9,925,499 B2
(45) Date of Patent: Mar. 27, 2018

(54) ISOLATION VALVE WITH SEAL FOR END CAP OF A FILTRATION SYSTEM

(71) Applicant: Evoqua Water Technologies LLC, Alpharetta, GA (US)

(72) Inventors: Michael Collignon, Annagrove (AU); Wah Khit Ng, Glen Huntly (AU)

(73) Assignee: Evoqua Water Technologies LLC, Pittsburgh, PA (US)

( * ) Notice: Subject to any disclaimer, the term of this patent is extended or adjusted under 35 U.S.C. 154(b) by 192 days.

(21) Appl. No.: 14/347,261

(22) PCT Filed: Sep. 26, 2012

(86) PCT No.: PCT/US2012/057198
§ 371 (c)(1),
(2) Date: Mar. 26, 2014

(87) PCT Pub. No.: WO2013/049109
PCT Pub. Date: Apr. 4, 2013

(65) Prior Publication Data
US 2014/0231349 A1   Aug. 21, 2014

(30) Foreign Application Priority Data
Sep. 30, 2011   (AU) .................................. 2011904046

(51) Int. Cl.
*C02F 1/44*    (2006.01)
*B01D 63/00*   (2006.01)
(Continued)

(52) U.S. Cl.
CPC ............. *B01D 65/10* (2013.01); *B01D 63/02* (2013.01); *B01D 65/00* (2013.01); *B01D 2313/18* (2013.01); *B01D 2313/21* (2013.01)

(58) Field of Classification Search
CPC .. A61M 1/0272; A61M 1/0281; A61M 1/265; A61M 1/34; A61M 1/342;
(Continued)

(56) References Cited

U.S. PATENT DOCUMENTS

| 256,008 A | 4/1882 | Leak |
| 285,321 A | 9/1883 | Tams |

(Continued)

FOREIGN PATENT DOCUMENTS

| AU | 34400/84 A | 4/1985 |
| AU | 55847/86 A | 9/1986 |

(Continued)

OTHER PUBLICATIONS

U.S. Appl. No. 13/436,219, filed Mar. 30, 2013.
(Continued)

*Primary Examiner* — Dirk Bass
*Assistant Examiner* — Hayden Brewster

(57) ABSTRACT

Systems and methods for isolating a filtration module are provided. The systems and methods may utilize a removable end cap comprising an isolation valve. In certain systems and methods, the isolation valve may be configured to selectively allow fluid communication between a port and a filtrate passageway of one filtration module in a plurality of filtration modules.

15 Claims, 8 Drawing Sheets

(51) Int. Cl.
  *B01D 65/00* (2006.01)
  *B01D 65/10* (2006.01)
  *B01D 63/02* (2006.01)
  B01D 11/00 (2006.01)
  B01D 35/00 (2006.01)
  B01D 36/00 (2006.01)
  B01D 61/00 (2006.01)

(58) Field of Classification Search
  CPC ............ A61M 1/3472; A61M 1/3633; A61M 1/5679; A61M 1/3687; A61M 1/38; A61M 2205/60; B01D 11/00; B01D 35/00; B01D 35/34; B01D 35/143; B01D 36/00; B01D 53/22; B01D 61/00; B01D 61/08; B01D 61/12; B01D 61/14; B01D 61/142; B01D 61/145; B01D 61/147; B01D 61/16; B01D 61/18
  USPC ..... 210/85, 96.2, 117, 252, 253, 257.2, 232, 210/321.6, 321.72, 321.8, 321.89, 321.9, 210/323.1, 323.2, 340, 454, 497.01, 210/500.23, 645, 650, 653, 806
  See application file for complete search history.

(56) References Cited

U.S. PATENT DOCUMENTS

| | | |
|---|---|---|
| 403,507 A | 5/1889 | Bode |
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,246,761 A | 4/1966 | Bryan et al. |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Jacob Shorr |
| 3,563,860 A | 2/1971 | Henderyckx |
| 3,591,010 A | 7/1971 | Pall et al. |
| 3,592,450 A | 7/1971 | Rippon |
| 3,625,827 A | 12/1971 | Wildi et al. |
| 3,628,775 A | 12/1971 | McConnell et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,827,566 A | 8/1974 | Ponce |
| 3,843,809 A | 10/1974 | Luck |
| 3,876,738 A | 4/1975 | Marinaccio et al. |
| 3,912,624 A | 10/1975 | Jennings |
| 3,937,015 A | 2/1976 | Akado et al. |
| 3,955,998 A | 5/1976 | Clampitt et al. |
| 3,962,095 A | 6/1976 | Luppi |
| 3,968,192 A | 7/1976 | Hoffman, III et al. |
| 3,992,301 A | 11/1976 | Shippey et al. |
| 3,993,816 A | 11/1976 | Baudet et al. |
| 4,016,078 A | 4/1977 | Clark |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,130,622 A | 12/1978 | Pawlak |
| 4,138,460 A | 2/1979 | Tigner |
| 4,157,899 A | 6/1979 | Wheaton |
| 4,169,873 A | 10/1979 | Lipert |
| 4,183,890 A | 1/1980 | Bollinger |
| 4,187,263 A | 2/1980 | Lipert |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |

(56) References Cited

U.S. PATENT DOCUMENTS

| | | |
|---|---|---|
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,752,421 A | 6/1988 | Makino |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,828,696 A | 5/1989 | Makino et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,911,838 A | 3/1990 | Tanaka |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,990,251 A | 2/1991 | Spranger et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,728 A | 5/1993 | Trimmer |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A * | 4/1995 | Selbie ............... B01D 35/303 210/232 |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |

(56) References Cited

U.S. PATENT DOCUMENTS

| | | |
|---|---|---|
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soifer et al. |
| 5,597,732 A | 1/1997 | Bryan-Brown |
| 5,607,593 A | 3/1997 | Cote et al. |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| 5,786,528 A * | 7/1998 | Dileo .................. B01D 65/102 73/38 |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,381 A * | 7/2000 | Connelly .......... B01D 17/0214 137/172 |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,162,020 A | 12/2000 | Kondo |
| 6,171,496 B1 | 1/2001 | Patil |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,224,767 B1 | 5/2001 | Fujiwara et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | MacHeras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,324,898 B1 | 12/2001 | Cote et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Groschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,623,643 B2 | 9/2003 | Chisholm et al. |
| 6,627,082 B2 | 9/2003 | Del Vecchio et al. |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |

(56) References Cited

U.S. PATENT DOCUMENTS

| | | | |
|---|---|---|---|
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,894 B2 | 6/2004 | Bikson et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,255,788 B2 | 8/2007 | Okazaki et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 8,002,246 B2 | 8/2011 | Eguchi et al. |
| 8,197,688 B2 | 6/2012 | Sakashita et al. |
| 8,287,923 B2 | 10/2012 | Hsu et al. |
| 8,679,337 B2 | 3/2014 | Ishibashi et al. |
| 2001/0027951 A1 | 10/2001 | Gungerich et al. |
| 2001/0035092 A1 | 11/2001 | Hachimaki et al. |
| 2001/0047962 A1 | 12/2001 | Zha et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0108906 A1* | 8/2002 | Husain ............... B01D 61/02 210/636 |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038075 A1 | 2/2003 | Akimoto et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1 | 4/2003 | Merrie et al. |
| 2003/0075495 A1 | 4/2003 | Dannstrom et al. |
| 2003/0075504 A1 | 4/2003 | Zha et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159977 A1 | 8/2003 | Tanny et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0035779 A1 | 2/2004 | Vossenkaul et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0118779 A1 | 6/2004 | Rawson et al. |
| 2004/0129637 A1* | 7/2004 | Husain ............... B01D 61/022 210/636 |
| 2004/0139992 A1 | 7/2004 | Murkute et al. |
| 2004/0145076 A1 | 7/2004 | Zha et al. |
| 2004/0149655 A1 | 8/2004 | Petrucco et al. |

(56) References Cited

U.S. PATENT DOCUMENTS

| | | |
|---|---|---|
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178136 A1 | 9/2004 | Taniguchi et al. |
| 2004/0178154 A1 | 9/2004 | Zha et al. |
| 2004/0188339 A1 | 9/2004 | Murkute et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0000885 A1 | 1/2005 | Stockbower |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0092674 A1 | 5/2005 | Mahendran et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0161389 A1 | 7/2005 | Takeda et al. |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0033222 A1 | 2/2006 | Godfrey et al. |
| 2006/0049093 A1 | 3/2006 | Chikura et al. |
| 2006/0065596 A1 | 3/2006 | Kent et al. |
| 2006/0081533 A1 | 4/2006 | Khudenko |
| 2006/0091074 A1 | 5/2006 | Pedersen et al. |
| 2006/0131234 A1 | 6/2006 | Zha et al. |
| 2006/0145366 A1 | 7/2006 | Thomas |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0095741 A1 | 5/2007 | Berends |
| 2007/0102339 A1* | 5/2007 | Cote ............ B01D 61/18 210/321.69 |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0163942 A1 | 7/2007 | Tanaka et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203016 A1 | 8/2008 | Johnson et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300548 A1* | 12/2010 | DeVerse ............ E04H 4/12 137/1 |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0049048 A1 | 3/2011 | Benner et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0147298 A1 | 6/2011 | Kennedy et al. |
| 2011/0192783 A1 | 8/2011 | Cox et al. |
| 2011/0198283 A1 | 8/2011 | Zha et al. |
| 2012/0074053 A1 | 3/2012 | Collignon et al. |
| 2012/0091602 A1 | 4/2012 | Cumin et al. |
| 2012/0097601 A1 | 4/2012 | Lee et al. |
| 2012/0187044 A1 | 7/2012 | Zha et al. |
| 2012/0285885 A1 | 11/2012 | James et al. |
| 2013/0037467 A1 | 2/2013 | Biltoft et al. |
| 2013/0056426 A1 | 3/2013 | Barnes |
| 2013/0153496 A1 | 6/2013 | Zha et al. |
| 2013/0168307 A1 | 7/2013 | Drivarbekk et al. |
| 2014/0174998 A1 | 6/2014 | Kerts et al. |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898 Y | 8/1995 |
| CN | 2236049 Y | 9/1996 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1468140 A | 1/2004 |
| CN | 1541757 A | 11/2004 |
| CN | 1735452 A | 2/2006 |
| CN | 101039739 A | 9/2007 |
| CN | 101052457 A | 10/2007 |
| CN | 101287538 A | 10/2008 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 19718028 C1 | 6/1998 |
| DE | 29804927 U1 | 6/1998 |
| DE | 29906389 U1 | 6/1999 |

(56) References Cited

FOREIGN PATENT DOCUMENTS

| | | |
|---|---|---|
| DE | 10045227 C1 | 2/2002 |
| DE | 10209170 C1 | 8/2003 |
| DE | 202004012693 U1 | 10/2004 |
| EP | 0038612 B1 | 10/1981 |
| EP | 0053833 A2 | 6/1982 |
| EP | 012557 B1 | 2/1983 |
| EP | 126714 A2 | 11/1984 |
| EP | 050447 B1 | 10/1985 |
| EP | 194735 A2 | 9/1986 |
| EP | 250337 A1 | 12/1987 |
| EP | 327025 A1 | 8/1989 |
| EP | 344633 A1 | 12/1989 |
| EP | 090383 B1 | 5/1990 |
| EP | 407900 A2 | 1/1991 |
| EP | 463627 A2 | 1/1992 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 B1 | 7/1994 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1052012 A1 | 11/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 A1 | 5/2006 |
| EP | 1420874 B1 | 1/2011 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53-5077 | 1/1978 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 | 7/1992 |
| JP | 04187224 A | 7/1992 |
| JP | 4-256425 | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05-4030 | 1/1993 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05279447 A | 10/1993 |
| JP | 05285348 A | 11/1993 |
| JP | 05305221 A | 11/1993 |
| JP | 06-027215 A | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |

(56) References Cited

FOREIGN PATENT DOCUMENTS

| | | |
|---|---|---|
| JP | 06343837 A | 12/1994 |
| JP | 07000770 A | 1/1995 |
| JP | 07024272 A | 1/1995 |
| JP | 07047247 A | 2/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |
| JP | 07236819 A | 9/1995 |
| JP | 07251043 A | 10/1995 |
| JP | 07256253 | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 A | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 200079390 A | 3/2000 |
| JP | 2000070684 A | 3/2000 |
| JP | 2000093758 | 4/2000 |
| JP | 2000157845 | 6/2000 |
| JP | 2000157850 A | 6/2000 |
| JP | 2000185220 A | 7/2000 |
| JP | 2000189958 A | 7/2000 |
| JP | 2000233020 A | 8/2000 |
| JP | 2000237548 A | 9/2000 |
| JP | 2000300968 A | 10/2000 |
| JP | 2000317276 A | 11/2000 |
| JP | 2000334276 A | 12/2000 |
| JP | 2000342932 A | 12/2000 |
| JP | 2001009246 A | 1/2001 |
| JP | 2001070967 A | 3/2001 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001-510396 T | 7/2001 |
| JP | 2001179059 A | 7/2001 |
| JP | 2001179060 A | 7/2001 |
| JP | 2001190937 A | 7/2001 |
| JP | 2001190938 A | 7/2001 |
| JP | 2001205055 A | 7/2001 |
| JP | 2001212587 A | 8/2001 |
| JP | 2001232160 A | 8/2001 |
| JP | 2001-269546 | 10/2001 |
| JP | 2002011472 A | 1/2002 |
| JP | 2002143849 A | 5/2002 |
| JP | 2002177746 A | 6/2002 |
| JP | 3302992 B2 | 7/2002 |
| JP | 2002525197 T | 8/2002 |
| JP | 2002527229 A | 8/2002 |
| JP | 2002263407 A | 9/2002 |
| JP | 2002-336663 | 11/2002 |
| JP | 2003024751 | 1/2003 |
| JP | 2003047830 A | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 A | 9/2003 |
| JP | 2003266072 A | 9/2003 |
| JP | 2003275759 A | 9/2003 |
| JP | 2003340250 A | 12/2003 |
| JP | 2004008981 | 1/2004 |
| JP | 2004050011 A | 2/2004 |
| JP | 2004073950 A | 3/2004 |
| JP | 2004-230287 A | 8/2004 |
| JP | 2004216263 A | 8/2004 |
| JP | 2004230280 A | 8/2004 |
| JP | 2004249168 A | 9/2004 |
| JP | 2004322100 A | 11/2004 |
| JP | 2004-536710 A | 12/2004 |
| JP | 2004337730 A | 12/2004 |
| JP | 2005-502467 A | 1/2005 |
| JP | 2005-087887 A | 4/2005 |
| JP | 2005144291 A | 6/2005 |
| JP | 2005154551 A | 6/2005 |
| JP | 2005279447 A | 10/2005 |
| JP | 2006116495 | 5/2006 |
| JP | 2007547083 | 8/2010 |
| JP | 4833353 B2 | 12/2011 |
| KR | 20-0232145 | 7/2001 |

(56) References Cited

FOREIGN PATENT DOCUMENTS

| | | |
|---|---|---|
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 20030066271 | 8/2003 |
| KR | 20030097167 | 12/2003 |
| KR | 2005-063478 | 6/2005 |
| NL | 1006390 C2 | 12/1998 |
| NL | 1020491 C | 10/2003 |
| NL | 1021197 C | 10/2003 |
| NO | 20053769 A | 2/2006 |
| NZ | 510394 A | 5/2003 |
| NZ | 537874 A | 2/2007 |
| TW | 216773 B | 12/1993 |
| TW | 347343 | 12/1998 |
| WO | 1985001449 A1 | 4/1985 |
| WO | 1986005116 A1 | 9/1986 |
| WO | 1986005705 A1 | 10/1986 |
| WO | 8800494 A1 | 1/1988 |
| WO | 8801529 A1 | 3/1988 |
| WO | 88001895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 1993002779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 199629142 A1 | 9/1996 |
| WO | 9641676 A1 | 12/1996 |
| WO | 9706880 A2 | 2/1997 |
| WO | 9710046 A1 | 3/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 9906326 A1 | 2/1999 |
| WO | 199908773 A1 | 2/1999 |
| WO | 99-55448 A1 | 11/1999 |
| WO | 9959707 A1 | 11/1999 |
| WO | 0021890 A1 | 4/2000 |
| WO | 200018498 A1 | 4/2000 |
| WO | 0030740 A1 | 6/2000 |
| WO | 200030742 A1 | 6/2000 |
| WO | 200100307 A2 | 1/2001 |
| WO | 200105715 A1 | 1/2001 |
| WO | 0108790 A1 | 2/2001 |
| WO | 200119414 A1 | 3/2001 |
| WO | 200132299 A1 | 5/2001 |
| WO | 200136075 A1 | 5/2001 |
| WO | 0143856 A1 | 6/2001 |
| WO | 200145829 A1 | 6/2001 |
| WO | 2002004100 | 1/2002 |
| WO | 0211867 A1 | 2/2002 |
| WO | 0230550 A1 | 4/2002 |
| WO | 200226363 A2 | 4/2002 |
| WO | 0238256 A1 | 5/2002 |
| WO | 2002040140 A1 | 5/2002 |
| WO | 2002047800 A1 | 6/2002 |
| WO | 2003000389 A2 | 1/2003 |
| WO | 03013706 A1 | 2/2003 |
| WO | 2003013706 A1 | 2/2003 |
| WO | 2003024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 2003095078 A1 | 11/2003 |
| WO | 04024304 A2 | 3/2004 |
| WO | 2004018084 A1 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005023997 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005070524 A1 | 8/2005 |
| WO | 2005077499 A1 | 8/2005 |
| WO | 2005082498 A1 | 9/2005 |
| WO | 2005107929 A2 | 11/2005 |
| WO | 2006017911 A1 | 2/2006 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066319 A1 | 6/2006 |
| WO | 2006066350 A1 | 6/2006 |
| WO | 2006126833 A1 | 11/2006 |
| WO | 2007022576 A1 | 3/2007 |
| WO | 2007053528 A2 | 5/2007 |
| WO | 2007065956 A1 | 6/2007 |
| WO | 2007073080 A1 | 6/2007 |
| WO | 2007135087 A1 | 11/2007 |
| WO | 2008025077 A1 | 3/2008 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |
| WO | 2013048801 A1 | 4/2013 |
| WO | 2013049109 A1 | 4/2013 |

OTHER PUBLICATIONS

U.S. Appl. No. 12/792,307, filed Jun. 2, 2010.
U.S. Appl. No. 13/396,275, filed Feb. 14, 2012.
U.S. Appl. No. 14/090,491, filed Nov. 26, 2013.
U.S. Appl. No. 14/177,749, filed Feb. 11, 2014.
U.S. Appl. No. 13/943,411, filed Jul. 16, 2013.
U.S. Appl. No. 12/096,279, filed Dec. 11, 2006.
U.S. Appl. No. 12/439,209, filed Aug. 30, 2007.
U.S. Appl. No. 13/059,283, filed Aug. 17, 2009.
U.S. Appl. No. 14/428,718, filed Mar. 17, 2015.
Berg et al., "Flux Decline in Ultrafiltration Processes," Desalination, 77 (1990) pp. 101-133.
Almulla et al., "Developments in high recovery brackish water desalination plants as part of the solution to water quantity problems," Desalination, 153 (2002), pp. 237-243.
Anonymous, "Nonwoven Constructions of Dyneon™ THV and Dyneon™ HTE Fluorothermoplastics", Research Disclosure Journal, Apr. 1999, RD 420013, 2 pages.
Australian Patent Examination Report No. 1 dated Aug. 12, 2014 for Application No. 2013200808.
Cote et al. "A New Immersed Membrane for Pretreatment to Reverse Osmosis," Desalination, 139 (2001), pp. 229-236.
Cote et al., "Immersed Membranes Activated Sludge Process Applied to the Treatment of Municipal Wastewater," Wat. Sci. Tech. 38(4-5) (1998), pp. 437-442.
Coulson et al., "Coulson and Richardson's Chemical Engineering," 1999, vol. 1, pp. 358-364.
Crawford et al., American Water Works Association Membrane Technology Conference, "Procurement of Membrane Equipment: Differences Between Water Treatment and Membrane Bioreactor (MBR) Applications," (2003).

(56) References Cited

OTHER PUBLICATIONS

Cui et al., "Airlift crossflow membrane filtration—a feasibility study with dextran ultrafiltration," J. Membrane Sci. (1997) vol. 128, pp. 83-91.

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Delgrange-Vincent et al., "Neural networks for long term prediction of fouling and backwash efficiency in ultrafiltration for drinking water production," Desalination 131 (2000) pp. 353-362.

Dow Chemical Company, "Filmtec Membranes—Cleaning Procedures for Filmtec FT30 Elements," Tech Facts, Online, Jun. 30, 2000, XP002237568.

EPA, Membrane Filtration Guidance Manual, Nov. 2005.

Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.

Johnson, "Recent Advances in Microfiltration for Drinking Water Treatment," AWWA Annual Conference, Jun. 20-24, 1999, Chicago, Illinois, entire publication.

Jones, Craig, "Applications of Hydrogen Peroxide and Derivatives," The Royal Society of Chemistry, Cambridge, UK 1999, Chapters 2 and 5.

Judd, "The MBR Book: Principles and Applications of Membrane Bioreactors in Water and Wastewater Treatment," (2006), pp. 174-178.

Kaiya et al., "Water Purification Using Hollow Fiber Microfiltration Membranes," 6th World Filtration Congress, Nagoya, 1993, pp. 813-816.

Kang et al. "Characteristics of microfiltration membranes in a membrane coupled sequencing batch reactor system," Water Research, 37(5) Mar. 2003, pp. 1192-1197, Elsevier, Amsterdam, NL.

Lloyd, D.R. et al. "Microporous Membrane Formation Via Thermally Induced Phase Separation/Solid-Liquid Phase Separation," Journal of Membrane Science, 52(3) (1990), pp. 239-261, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Mark et al., "Peroxides and Peroxy Compounds, Inorganic," Kirk—Othmer Encyclopedia of Chemical Technology, Peroxides and Peroxy Compounds, Inorganic, to Piping Systems, New York, Wiley & Sons, Ed., Jan. 1, 1978, pp. 14-18.

MicroCTM—Carbon Source for Wastewater Denitrification. Information from Environmental Operating Solutions website including MSDS.

Miller et al., "Side Stream Air Lift MBR Development and Successful Application of a New Generation of MBR," Pollution Solutions Brochure, NORIT, The Netherlands, Apr. 2008.

Nakayama, "Introduction to Fluid Mechanics," Butterworth-Heinemann, Oxford, UK, 2000.

Ramaswammy S. et al. "Fabrication of Ply (ECTFE) Membranes via Thermally Induced Phase Separation", Journal of Membrane Science, (Dec. 1, 2002), pp. 175-180, vol. 210 No. 1, Scientific Publishing Company, Amsterdam, NL.

Rosenberger et al., "Filterability of activated sludge in membrane bioreactors," Desalination, 151 (2002), pp. 195-200.

Schematic of 4" Geyser Pump, Geyser Pump Tech. Co., Nov. 13, 2005.

U.S. Appl. No. 60/278,007, filed Mar. 23, 2001.

Ueda et al., "Effects of Aeration on Suction Pressure in a Submerged Membrane Bioreactor," Wat. Res. vol. 31, No. 3, 1997, pp. 489-494.

Water Encyclopedia, edited by Jay Lehr, published by John Wiley & Sons, Inc., Hoboken, New Jersey, 2005. Available at http://wwwmmrw.interscience.wiley.com/eow/.

White et al., "Optimisation of intermittently operated microfiltration processes," The Chemical Engineering Journal, 52 (1993), pp. 73-77.

Wikipedia, "Seawater," available at http://en.wikipedia.org/wiki/Seawater, Jul. 15, 2007.

Yamamoto et al., "Direct Solid-Liquid Separation Using Hollow Fiber Membrane in an Activated Sludge Aeration Tank," Water Science Technology, 21 (1989), pp. 43-54.

Yoon: "Important operational parameters of membrane bioreactor-sludge disintegration (MBR-SD) system for zero excess sludge production" Water Research, 37 (2003), pp. 1921-1931, Elsevier, Amsterdam, NL.

Zenon, "Proposal for ZeeWeed® Membrane Filtration Equipment System for the City of Westminster, Colorado, Proposal No. 479-99," Mar. 2000, entire publication.

\* cited by examiner

ISOLATION VALVE WITH SEAL FOR END CAP OF A FILTRATION SYSTEM

BACKGROUND

Aspects and embodiments of the present invention relate to membrane filtration systems and, more particularly, to an end cap and header arrangement for such systems that is used to communicate fluids to and from the membranes elements.

SUMMARY

One or more aspects of the present disclosure involve embodiments directed toward a membrane filtration system. The membrane filtration system may comprise a first filtration module including a plurality of hollow fiber membranes. The plurality of hollow fiber membranes may be potted in and extend between an upper header and a lower header. The filtration system may include a first filtrate passageway defined in the upper header and in fluid communication with the plurality of hollow fiber membranes and a removable end cap. The removable end cap may comprise a port and a shut-off valve. The shut-off valve may include a seal configured to selectively allow fluid communication between the port and the first filtrate passageway.

According to a further aspect, the membrane filtration system may further comprise a plurality of filtration modules including respective upper headers having respective filtrate passageways. In another aspect, the membrane filtration system may further comprise a filtrate transfer manifold in fluid communication with the filtrate passageways in the upper headers of the plurality of filtration modules. In at least one aspect, the shut-off valve may be configured to isolate the plurality of hollow fiber membranes from the first filtrate passageway while the first filtrate passageway provides fluid communication between the filtrate passageways in the upper headers of the plurality of filtration modules.

According to various aspects, the shut-off valve may further comprise a shaft that protrudes through the removable end cap. In a further aspect, the shut-off valve may be disposed within a shut-off passageway in fluid communication with the first filtrate passageway. In yet a further aspect, an inner wall of the shut-off passageway and the shaft of the valve comprise complimentary mating structures configured to provide for displacement of the valve in the shut-off passageway and selectively allow fluid communication between the port and the filtrate passageway. In certain aspects, the shut-off valve may be configured to allow manual positioning of the seal. In at least one aspect, the shut-off passageway may comprise a viewing window.

In some aspects, the membrane filtration system may further comprise a filtrate receiving chamber in fluid communication with the filtrate passageway and the port. The filtrate receiving chamber may be in fluid communication between the port and the plurality of hollow fiber membranes. In a further aspect, the membrane filtration system may further comprise a filtrate transfer manifold and a filtrate transfer port. The filtrate transfer port may be positioned in fluid communication between the filtrate transfer manifold and the filtrate receiving chamber.

One or more further aspects of the present disclosure are directed to a membrane filtration system comprising at least one filtration module comprising a plurality of hollow fiber membranes potted in and extending between upper and lower headers. The upper header may include a first sealing surface and a filtrate passageway. The membrane filtration system may further comprise a removable end cap comprising a second sealing surface configured to selectively engage with the first sealing surface to selectively. The second sealing surface may selectively engage with the first sealing surface to allow fluid communication between the plurality of hollow fiber membranes and the filtrate passageway. In a further aspect, the membrane filtration system may further comprise a common filtrate manifold and a filtrate transfer port. The filtrate transfer port may be in fluid communication between the filtrate passageway and the common filtrate manifold.

One or more further aspects of the present disclosure involve embodiments directed to a method for replacing a filtration cartridge in a membrane filtration system. The method may comprise accessing a membrane filtration system comprising a plurality of filtration modules, wherein each filtration module comprises a filtration cartridge, an upper header defining a filtrate passageway, and a removable end cap in fluid communication with the upper header. The removable end cap may include a port in fluid communication with the filtrate passageway and a shut-off valve configured to selectively allow fluid communication between the port and the filtrate passageway. The method may further include evaluating at least one property of at least one filtration module to obtain a result. Responsive to the result of the evaluation, the method may further include accessing the at least one filtration module. The method may further include engaging at least one shut-off valve in at least one filtration module to interrupt fluid communication between the port and the filtrate passageway of the at least one filtration module while maintaining fluid communication between filtrate passageways in the upper headers of the plurality of filtration modules.

According to another aspect, evaluating may comprise measuring the at least one property, comparing the measured value with a target value, and identifying a fault in the at least one filtration module based on the comparison between the measured value and the target value. In at least one aspect, evaluating may comprise performing a pressure decay test. In certain aspects, the pressure decay test may be performed automatically by a control system.

In some aspects, engaging the at least one shut-off valve comprises extending a shaft of the at least one shut-off valve from an upper surface of the removable end cap to provide a visual indication of the at least one filtration module being offline. In other aspects, the method may further comprise disengaging the at least one shut-off valve to provide fluid communication between the port and the filtrate passageway. In at least one aspect, engaging and disengaging the at least one shut-off valve comprises rotating the shaft of the at least one shut-off valve.

BRIEF DESCRIPTION OF THE FIGURES

The accompanying figures are not intended to be drawn to scale. In the figures, each identical or nearly identical component that is illustrated in various figures is represented by a like numeral. For purposes of clarity, not every component may be labeled in every figure. In the figures.

DETAILED DESCRIPTION

Figure 1:
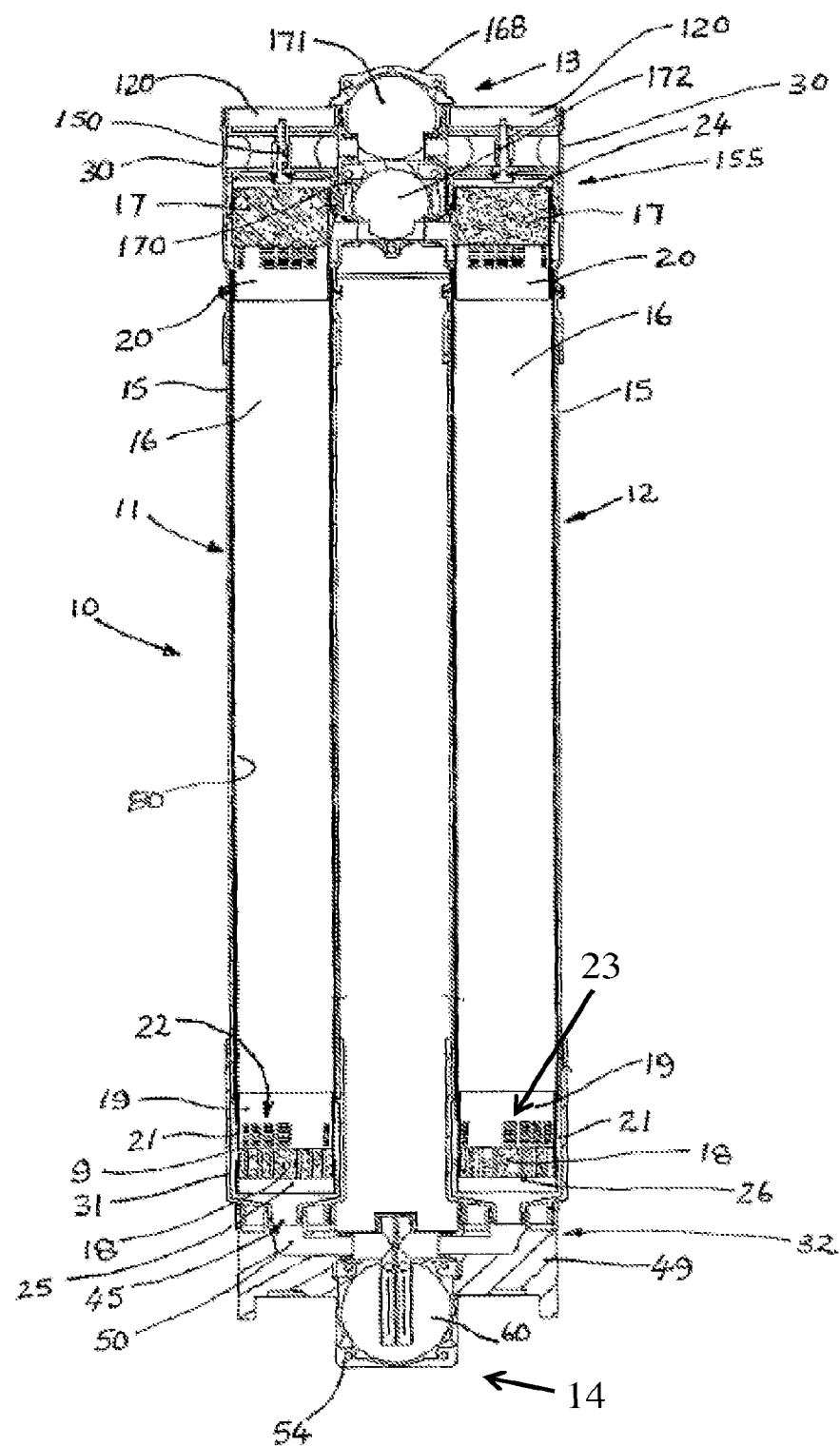
FIG. 1 is a schematic of a cross-sectional elevation view of a pair of membrane filtration modules in accordance with one or more aspects of the disclosure.

The methods and systems described herein may be described with reference to membrane filtration systems. The membrane filtration systems may include multiple modules including headers that retain filtration cartridges within the individual modules. A filter cartridge may be referred to as a filtration or membrane sub-module and the terms are used herein interchangeably. The filtration cartridge may comprise a filtration sub-system and may in some embodiments comprise a plurality of membranes. The plurality of membranes may comprise elongated bundles of permeable hollow fiber membranes. Feed liquid may be filtered by passing the feed liquid from the outside of the fiber membranes to the inside or lumen side of the fiber membranes and withdrawing the resulting filtrate from the membrane lumens.

A hollow fiber filtration module may comprise an elongated tubular casing enclosing a bundle of hollow fiber membranes. At one end of the tubular casing there may be a first header that has a feed passageway therethrough. The feed passageway may be in fluid communication with the interior of the tubular casing and the exterior of the fiber membranes. At the other end of the casing there may be a second header that has a filtrate passageway therethrough. The filtrate passageway may be in communication with the lumens of the fiber membranes.

At least one of the headers, which may be the lower header, may be provided with a gas conveying passageway in fluid communication with the interior of the casing and the exterior of the fiber membranes.

One or more passageways may be formed in off-set portions of the headers. The headers may have planar end faces. A plurality of such modules may be joined together without interconnecting manifolds or pipes to form a row of filter modules. A number of such rows of filter modules may be interconnected to define a bank of filter modules. Examples of filter cartridges and banks are shown in, for example, International Patent Application PCT/AU87/00309 (corresponding to U.S. Pat. Nos. 4,876,012 and 4,871,012) and PCT/AU90/00470 (corresponding to U.S. Pat. No. 5,194,149). These applications and patents are incorporated herein by reference in their entireties for all purposes.

Filtration systems often comprise a plurality of filtration modules fluidly connected to one another by manifolds. Manifolds for communicating fluids to and from the headers may be arranged above and/or below the headers.

Filtration systems generally comprise a plurality of filtration modules, and the modules are often arranged in banks that form large arrays. The filter cartridges in these types of systems may have a finite life and may therefore be removed for cleaning or replacement at regular intervals during the operating life of a system. Filtration module assemblies having upper and lower mountings often require vertically displacing at least one of the upper and lower mountings and then removing a filtration module and/or cartridge laterally from between the mountings to remove/replace a single cartridge or to otherwise service the filtration module. The position of the manifolds may require that the filtration module and/or cartridge be removed laterally to maneuver around the vertically positioned manifolds. To remove modules and/or cartridges laterally may require neighbouring modules in the bank to be removed to allow access to modules located further within the bank. Evaluating a single module, especially one located deep within a multi-rowed array of membrane modules, may result in the entire system or portions of the system to be off-line for undesirably long periods of time. This is particularly true in instances where the cartridge to be evaluated, replaced, or serviced is located deep within the bank of modules.

The membranes in the filter cartridges may desirably undergo regular testing, evaluation, diagnosis, cleaning, and/or replacement. For example, when a membrane within a filtration module fails, it may be desired to isolate the module from the remainder of the system to prevent contamination of filtrate produced from the filtration system with feed liquid. It is therefore desirable to provide a simple means of isolating modules when failure of a membrane occurs. In addition, it is desirable to provide an isolation arrangement that is readily serviceable without unduly disrupting operation of the filtration system. Some aspects and embodiments of the methods and systems described herein advantageously provide a manifold arrangement that simplifies the removal of individual filtration cartridges from banks of filtration modules.

As used herein, the term "evaluating" may refer to one or more of a number of actions related to maintaining proper working order of the filtration module, such as servicing, monitoring, testing, analyzing, measuring, cleaning, and diagnosing. Evaluating may include replacing a filtration cartridge. For example, evaluating may refer to analyzing or examining one or more properties of the filtration module or cartridge, such as performing a pressure decay test. A pressure measurement or a series of pressure measurements may be obtained and the measured value(s) may be compared against a target value or values. If the measured value(s) fails to meet the target value(s), the filtration cartridge may be replaced with a replacement cartridge.

Evaluation of a filtration module and/or cartridge may be performed using any one of a number of different methods, including using a control system or by one or more operators manually performing one or more steps. For example, filtration modules may be equipped with one or more sensors. The sensors may be configured to detect or measure at least one operating parameter of the filtration module, non-limiting examples including filtrate purity, flow rate, and transmembrane pressure. A control system may be configured to compare a measured value against a target value or range of values. If the measured value(s) fails to meet the target value or values, then the control system may automatically engage a shut-off valve to halt the flow of filtrate through the module or cartridge. In the alternative, the operating parameters may be measured or detected using manual methods performed by one or more operators. The shut-off valve may then be engaged manually.

One or more aspects of the methods and systems described herein relate to improved filtration module assemblies. The improved filtration module assemblies may be advantageously used in filtration systems. Aspects and embodiments of the filtration module assemblies disclosed herein may desirably reduce the downtime required to service a filtration module of a filtration system. Aspects and embodiments of the filtration module assemblies disclosed herein may also enable filtration modules of a filtration system to be used with an improved end cap arrangement.

According to one or more aspects, a membrane filtration system may comprise a first filtration module including a plurality of hollow fiber membranes. The hollow fiber membranes may be potted in and extend between upper and lower headers. The filtration system may further comprise a first filtrate passageway defined in the upper header and in fluid communication with the plurality of hollow fiber membranes. In some embodiments, the first filtrate passageway may be in fluid communication with the lumen, or interior side of the hollow fiber membranes. The filtration system may further comprise a removable end cap. As used herein, a "removable end cap" is one which may be reversibly removed from a membrane module without causing damage to either the removable end cap or any other portion of the membrane module in which it is included. A removable end cap which has been removed from a filtration module may be replaced in the module and the module may operate with no loss of performance caused by the removal and replacement of the removable end cap. In certain embodiments, the removable end cap may comprise a port and a shut-off valve. In at least one embodiment, the shut-off valve may include a seal that is configured to selectively allow fluid communication between the port and the first filtrate passageway.

In some embodiments, the filtration system may further comprise a plurality of filtration modules. The plurality of filtration modules may include respective upper headers having respective filtrate passageways. The filtration system may further comprise a filtrate transfer manifold in fluid communication with the filtrate passageways. In certain embodiments, a shut-off valve of a first filtration module having a first filtrate passageway is configured to isolate the plurality of hollow fiber membranes in the first filtration module from the first filtrate passageway while the first filtrate passageway provides fluid communication between the filtrate passageways in the upper headers of the plurality of filtration modules. In at least one embodiment, the shut-off valve is configured to allow manual positioning of a seal coupled to the shut-off valve.

According to certain embodiments, the filtration system may further comprise a shut-off passageway. The shut-off passageway may comprise a viewing window. The viewing window may allow a user to visually inspect for the presence of bubbles during the course of a pressure decay test.

In various embodiments, the shut-off valve may further comprise a shaft that protrudes through the removable end cap. The shut-off valve may be disposed within the shut-off passageway. In certain embodiments, a port in the removable end cap may be in fluid communication with the first filtrate passageway. An inner wall of the shut-off passageway and the shaft of the valve may comprise complimentary mating structures. The complimentary mating structures may be configured to provide for displacement of the valve in the shut-off passageway and selectively allow fluid communication between the port and the filtrate passageway. As used herein, the term "complimentary mating structures" refers to a first surface with structures that are configured to receive structures of a second surface. The complimentary mating structures may be any structures that are suitable for the purpose of performing the function of selectively allowing fluid communication. For example, in some embodiments, the complimentary mating structures may include a screw and thread arrangement. Other non-limiting examples of mating structures may include plug and hole, keyed, or bayonet arrangements.

According to one embodiment, the filtration system further comprises a filtrate receiving chamber. The filtrate receiving chamber may be in fluid communication with the filtrate passageway and the port. The filtrate receiving chamber may be in fluid communication between the port and the plurality of hollow fiber membranes. According to another embodiment, the filtration system may further comprise a filtrate transfer manifold and a filtrate transfer port. The filtrate transfer port may be positioned in fluid communication between the filtrate transfer manifold and the filtrate receiving chamber.

According to one or more aspects, a membrane filtration system may comprise at least one filtration module. The filtration module may comprise a plurality of hollow fiber membranes. The hollow fiber membranes may be potted in and extend between upper and lower headers. In certain aspects, the upper header may include a first sealing surface and a filtrate passageway. The filtrate passageway may be in fluid communication with the plurality of hollow fiber membranes. In at least one aspect, the membrane filtration system may further comprise a removable end cap. The removable end cap may comprise a second sealing surface configured to selectively engage with the first sealing surface to selectively allow fluid communication between the plurality of hollow fiber membranes and the filtrate passageway. The first and second sealing surfaces may be any surfaces that are suitable for the purposes of performing selective fluid communication. For example, the first sealing surface may be a bottom surface of a base portion of the removable end cap and the second sealing surface may be an upper surface of a potting head. In certain aspects, when the first and second sealing surfaces are engaged with each other, fluid communication between the filtrate passageway and the lumens of the hollow fiber membranes may be disrupted. In some embodiments, the filtration system may further comprise a common filtrate manifold. In other embodiments, the filtration system may further comprise a filtrate transfer port. In certain instances, the filtrate transfer port may be in fluid communication between the filtrate passageway and the common filtrate manifold.

The systems and methods described herein may provide a method for replacing a filtration cartridge in a membrane filtration system. The method may comprise accessing a membrane filtration system comprising a plurality of filtration modules. Each filtration module may comprise a filtration cartridge, an upper header defining a filtrate passageway, and a removable end cap. The removable end cap may be in fluid communication with the upper header. The removable end cap may include a port in fluid communication with the filtrate passageway. The removable end cap may further comprise a shut-off valve configured to selectively allow fluid communication between the port and the filtrate passageway.

The method may further comprise evaluating at least one property of at least one filtration module to obtain a result. The evaluation may be performed as discussed and characterized above. For example, evaluating may comprise performing a pressure decay test on the filtration module. Responsive to the result of the evaluation, the method may further comprise accessing the at least one module. For example, if the filtration module fails the pressure decay test, the module may then be accessed. As used herein, the term "accessing" refers to controlling one or more features of the filtration module. For example, accessing may be performed by a control system. The control system may be configured to send one or more signals to the filtration module that control one or features, such as the shut-off valve. In another example, accessing may be performed by a user, such as an operator. The operator may manually control one or more features of the filtration module, such as the shut-off valve. The method may further comprise engaging at least one shut-off valve in at least one filtration module to interrupt fluid communication between the port and the filtrate passageway of the at least one filtration module. When the shut-off valve is engaged in this way, fluid communication between filtrate passageways in the upper headers of the plurality of filtration modules may be maintained. For example, when one or more filtration modules in a bank of filtration modules fail a pressure decay test, the shut-off valves for the failing filtration modules may be engaged. This isolates the membranes of the failing filtration modules from the filtrate passageways associated with the non-failing modules and prevents a damaging source of contaminating feed from entering the filtrate passageways. Fluid communication between the filtrate passageways of the non-failing filtration modules may be maintained through the filtrate passageway(s) of the failing filtration modules even when the shut-off valves for the failing filtration modules are engaged.

In at least one aspect, evaluating comprises measuring at least one property, comparing the measured value with a target value, and making a determination as to the existence or absence of a fault in the at least one filtration module based on the comparison between the measured value and the target value. In certain aspects, evaluating may comprise performing a pressure test or a pressure decay test. For example, the at least one property that is measured may be a transmembrane pressure associated with the hollow fiber membranes. When one or more membranes break, the measurements associated with the transmembrane pressure may produce values that fail to comply with one or more target values. The filtration module may be taken offline in response to the determination of the existence of a fault, for example, by engaging the shut-off valve. In some aspects, the pressure decay test may be performed automatically by a control system. For example, sensors positioned in the filtration module may provide transmembrane pressure measurements. The sensors may be in communication with the control system. If the transmembrane measurements associated with a specific module are indicative of a failure, the control system may signal the shut-off valve associated with that module to close.

According to another aspect, engaging the shut-off valve comprises extending a shaft of the shut-off valve from an upper surface of a removable end cap of a filtration module. The protruding shaft may provide a visual indication of the filtration module being offline. In some aspects, the method may further comprise disengaging the shut-off valve to provide fluid communication between a port in the removable end cap of the filtration module and a filtrate passageway in the module. In at least one aspect, engaging and disengaging the shut-off valve may comprise rotating the shaft of the shut-off valve.

The embodiments described herein are described with reference to hollow fiber membranes, but it should be understood that the methods and systems are not necessarily limited thereto and may be applied to systems incorporating other kinds of filter membranes, such as porous or permeable membranes in a spiral wound, mat, or sheet form.

Certain aspects and embodiments described herein may relate to filter module assemblies comprising one or more filter membrane cartridges or sub-module assemblies. The filter membrane cartridges may have symmetrical potting heads attached to either end. It should be noted that filter membrane cartridges or sub-modules having dissimilar potting heads are also contemplated.

Various aspects and embodiments described herein may relate to filter module assemblies that utilize headers constructed to transport fluids in the form of, for example, feed, filtrate, and gas to other headers, for example, adjacent like headers, and into and out of the filter module, cartridge, or sub-module assembly to which they are connected.

Aspects of the present disclosure provide a removable end cap configured to seal with a header of a membrane filtration module. The removable end cap may be referred to simply as an end cap. The end cap may include a fluid transfer passageway that is in fluid communication with one of the opposed sides of the end cap and with a face of the end cap that is in fluid communication with a filter membrane cartridge. The fluid transfer passageway may be selectively opened and closed by a valve. In some aspects, an inlet to the fluid transfer passageway from the membrane filtration module may be sealed open or shut by the valve. In other aspects, an outlet from the fluid transfer passageway to a filtrate manifold that is in fluid communication with the fluid transfer passageway may be sealed open or shut by a valve.

In accordance with some embodiments, the removable end cap may have features that advantageously control fluid flow. In some embodiments, a valve may operate to disconnect a filtration module from a filtration system without interfering with other modules in the system. In certain aspects, the valve may be positioned within the end cap and be operable from the exterior of the end cap. In various aspects, a face of the end cap may be a base portion of the end cap. In some aspects, an outlet of the fluid passageway may be provided in a base portion of the end cap. In various aspects, the status of the valve may be ascertained by visual inspection of the exterior of the header.

In at least one aspect, the end cap may be movable within the header between a first position and a second position. In the first position, the end cap may define a fluid transfer passageway within the header that is in fluid communication with the membrane filtration module and a filtrate outlet. The fluid transfer passageway may be closed off when the end cap is moved to the second position.

In various aspects, the fluid transfer passageway may be in fluid communication with a filtrate discharging face of a potting head of the membrane filtration module. When the end cap is in the second position, it may seal with the filtrate discharging face to close off the fluid transfer passageway. In certain aspects, the end cap may be positioned adjacent to the filtrate discharging face to form the seal.

Aspects and embodiments of the present invention relate to membrane filtration systems having multiple filtration modules connected together in a bank of filtration modules. A fluid control module, alternatively referred to herein as a manifold, may fluidly communicate a source of feed and a source of aeration gas to headers of one or more of the filtration modules in the bank. At least one of the fluid control module and the filtration module headers may include integrated feed, filtrate, and gas conduits. The fluid control module may be configured to automatically deliver gas to the filtration module headers upon introduction of gas into a feed conduit included within a body of the fluid control module.

Examples of types of fluid control manifolds that may be used with the methods and systems described herein are described in co-owned Australian Patent Application No. 2010902334, the subject matter of which is incorporated herein in its entirety.

A filter module assembly in accordance with various aspects and embodiments disclosed herein is illustrated generally at 10 in FIG. 1. In the figure, assembly 10 has filter modules 11 and 12 mounted in common upper and lower manifolds, 13 and 14 respectively. Each filter module 11 and 12 may include a tubular outer casing 15 that encloses a respective sub-module or cartridge 16. The casing 15 may extend between a lower socket 31 and an upper header housing 30. Lower socket 31 may be mounted to lower header 32. Lower header 32 may include a head piece 49. Headpiece 49 may be connected to a fluid control manifold 54 that selectively provides feed liquid and air to lower header 32.

Cartridge 16 may comprise a plurality of hollow fiber membranes (not shown) potted in and extending vertically between opposed lower and upper potting heads 17 and 18. Potting heads 17 and 18 may be formed of resinous potting material and may be generally cylindrical in configuration. It should be noted that the shape and size of the potting heads is not narrowly critical and a variety of configurations may be used, including square, rectangular, triangular or elliptical shapes. The potting heads may be provided with through openings or holes 26 to flow gas and liquid into the cartridge 16.

The hollow fiber membranes may form the working part of the filter cartridge. Each fiber membrane may have an average pore size of about 0.2 microns, a wall thickness of about 600 microns and a lumen diameter of about 200 microns. The fiber membranes may be arranged in bundles. There may be about 14,000 hollow fibers in the bundle, but this number, as well as the individual fiber dimensions and characteristics, are not narrowly critical and may be varied according to operational requirements.

Each potting head 17, 18 may be cast into and peripherally surrounded on its outer side by a respective potting sleeve 19, 20 that extends longitudinally in the direction of the fibers toward a respective opposed potting head 17, 18. Each potting sleeve 19, 20 may extend beyond the interface between the potting head 17, 18 and the fibers extending longitudinally from potting head 17, 18 toward a respective opposed potting head 17, 18 to form a fluid communication region 21.

Each potting sleeve 19, 20 may have a plurality of openings 22, formed therein and located in the fluid communication region 21. In this embodiment, an array of openings 22 may be provided that are spaced circumferentially and longitudinally from each other. Each opening 23 may be in the form of a circumferentially extending slot. It will be appreciated that the number, size and shape of the opening 23 is not narrowly critical. The openings 22 are preferably positioned near the distal end 24, 25 of each potting head 17, 18.

Figure 4:
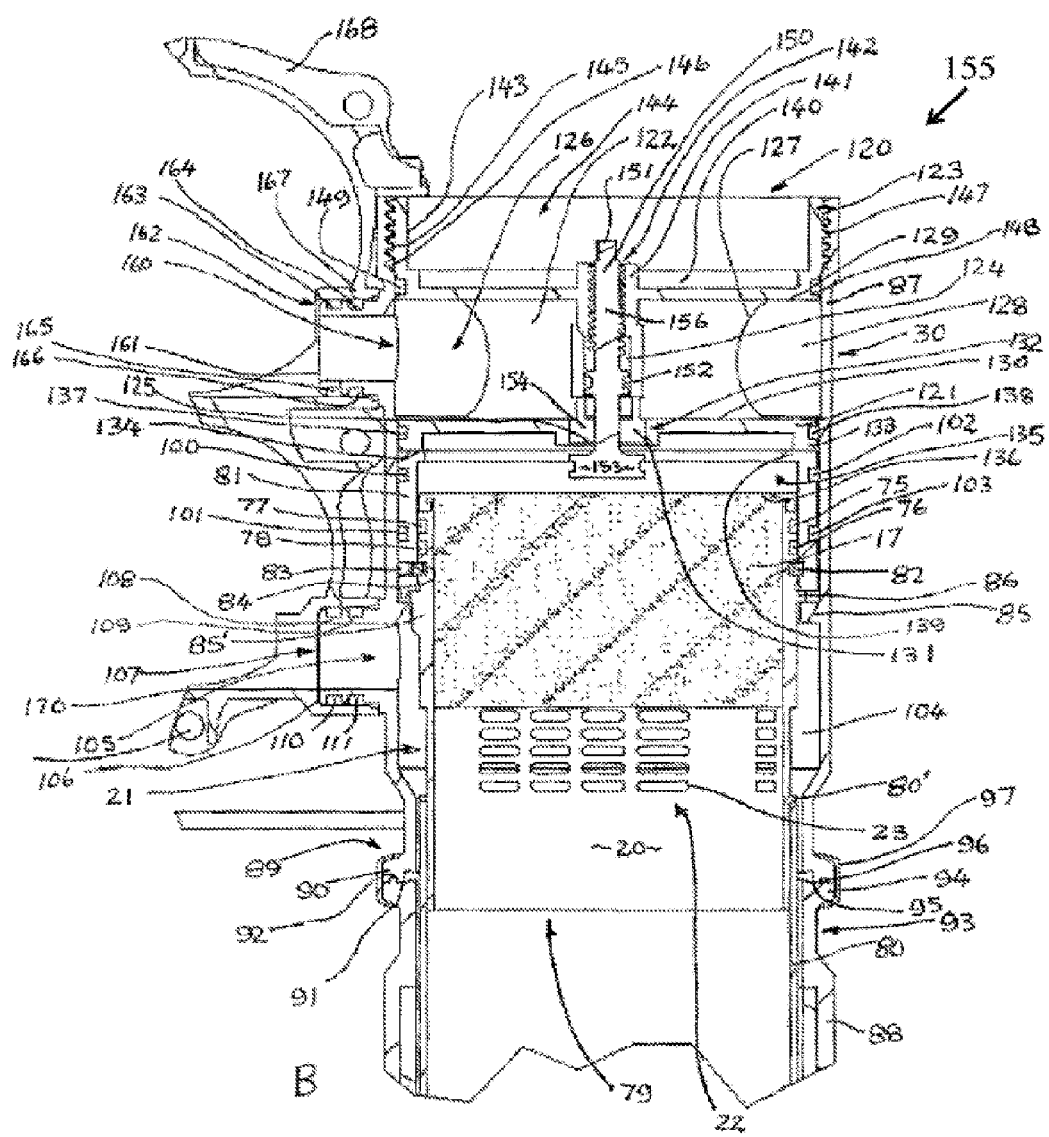
FIG. 4 is an enlarged schematic of a cross-sectional elevation view of region B of FIG. 2.

As shown in FIG. 4, the upper ends of the fiber membranes (not shown) may be embedded in an upper potting head 17. The potting head 17 may include, for example, a plug of resinous material such as polyurethane that is cast into an upper potting sleeve 20. Around the periphery of the upper end of potting sleeve 20 there may be a pair of grooves 75 and 76 for receiving O-rings 77 and 78 respectively. The lower end 79 of the upper potting sleeve 20 may be configured to receive a cylindrical screen 80 that encloses the fiber membranes (not shown).

Cylindrical screen 80 may extend between the lower end 79 of the upper potting sleeve 20 and the upper end of the lower potting sleeve 19. The screen 80 may extend longitudinally along the outer wall of the potting sleeve to a position spaced by a circumferential rib 80' from the fluid communication region 21. In one embodiment, the screen 80 may be a thin-walled solid tube, but it will be appreciated that other forms of screen may be used. The screen may function to protect the membranes during handling of the sub-modules and also assist in retaining fluid flow within the membrane bundle. The smooth surface of the solid tube screen may also reduce the potential for abrasion of the membranes during use.

The upper potting sleeve 20 may fit within an annular adaptor 81 at its upper end. The potting sleeve 20 may be engaged and held within the annular adaptor 81 by means of a circlip 82 located in mating grooves 83, 84 that may be provided on the respective external and internal walls of the upper potting sleeve 20 and annular adaptor 81. The upper potting sleeve 20 may be supported on a radially extending shoulder 85 on the upper housing 30 by an outwardly extending rib 86 on the upper potting sleeve 20. A locking protrusion 85' may be formed on the external wall of the upper potting sleeve 20 spaced below grooves 83, 84 that may accommodate circlip 82. The locking protrusion 85' may engage with a slot (not shown) formed in shoulder 85 to prevent relative rotation between the upper potting sleeve 20 and the upper housing 30.

The upper potting sleeve 20 and annular adaptor 81 may be surrounded by and mounted within upper header housing 30. Upper header housing 30 may be referred to as an upper housing or simply as a housing. The upper header housing 30 may be open-ended and dimensioned to closely receive the upper potting sleeve 20 and annular adaptor 81.

The upper header housing 30 may be formed of an upper and lower component 87, 88. The lower end 89 of the upper component 87 may be provided with a peripheral flange 90. The lower face 91 of the peripheral flange 90 may be provided with an annular groove 92. The upper end 93 of the lower component 88 may be provided with a peripheral flange 94 that may be positioned adjacent to the peripheral flange 90 of the upper component 87. The upper face 95 of the peripheral flange 94 of the lower component 88 may be provided with an annular rib 96. Annular rib 96 may be is sized to mate and fit within annular groove 92 when the flanges 90, 94 of the upper and lower components 87, 88 are positioned adjacent to each other. A dovetail seal may be provided between flanges 90 and 94. Flanges 90, 94 may be held adjacent to each other by an external C-section clip 97 that may fit over and engage with the periphery of flanges 90, 94 of upper and lower component 87, 88. Clip 97 may be a resilient self-actuating device biased to retain flanges 90, 94 in an abutted position. Flanges 90, 94 may be disengaged by spreading and removing clip 97 either manually or with a tool.

In use, annular adaptor 81 may be sealed against upper component 87 of header housing 30. Around the periphery of annular adaptor 81 there may be a pair of annular grooves 100 and 101 that support O-rings 102 and 103. O-rings 102, 103 may bear against the inner wall of upper component 87 to provide the sealing engagement.

Between peripheral flange 90 at its lower end 89 and annular grooves 100, 101, upper component 87 of upper header housing 30 may be provided with an enlarged diameter portion to form an annular fluid transfer passageway 104. Fluid transfer passageway 104 may be positioned between the outer wall of upper potting sleeve 20 and the inner wall of upper component 87 of upper header housing 30. A fluid transfer port 105 may be located in a side wall of the upper component 87 adjacent to and extending from the annular fluid transfer passageway 104. Fluid transfer port 105 may be provided with a tubular connection flange 106 at its free end 107. Around the periphery of the tubular connection flange 106 there may be a pair of annular grooves 108 and 109 that support O-rings 110 and 111.

In use, when the upper potting sleeve 20 is mounted within upper header housing 30, potting sleeve 20 may be positioned so that openings 22 of fluid communication region 21 are in fluid communication with annular fluid transfer passageway 104.

Locking protrusion 85' may prevent relative rotation between upper potting sleeve 20 and upper header housing 30. The prevention of the relative rotation may be desirable to allow the location of openings 22 to be spaced from the fluid transfer port 105 and therefore prevent damage to the membranes in the region of fluid outflow.

Upper potting sleeve 20 and its attached annular adaptor 81 may be held at the mounting location within the upper header housing 30 by a removable end cap 120. The end cap 120 may comprise a base portion 121, a reduced diameter mid portion 122, and an upper portion 123. The end cap 120 may further comprise a centrally located shut-off passageway 124 that extends from the upper portion 123 to the lower side 125 of the base portion 121. The reduced diameter mid-portion 122 may form a filtrate discharge passageway 126 comprising an internal concave wall 127 and a number of radially extending reinforcement ribs 128 between the upper and lower walls 129, 130 of the filtrate discharge passageway 126. Filtrate discharge passageway 126 may also be referred to as filtrate passageway 126.

Base portion 121 of end cap 120 may comprise a central boss portion 131 through which the shut-off passageway 124 opens at its lower end 132. Base portion 121 may comprise a circumferential downwardly extending rib 133 that, in use, bears against an upper peripheral edge 134 of the annular adaptor 81 spaced from the upper surface 136 of the upper potting head to define a filtrate receiving chamber 135 between the upper surface 136 of the upper potting head 17 and the end cap 120. The upper peripheral edge 134 of the annular adaptor 81 may be provided with an inwardly extending circumferential lifting shoulder 139. Open ends of the fiber membranes potted in upper potting head 17 may open into filtrate receiving chamber 135 to provide fluid communication between the lumens of the fiber membranes and the filtrate receiving chamber 135.

An outer wall of the base portion 121, adjacent the downwardly extending rib 133, may be provided with a peripheral groove 137 that supports an O-ring 138. This arrangement may provide a seal between end cap 120 and upper header housing 30.

Upper portion 123 of end cap 120 may comprise a floor 140 with a centrally located boss portion 141 through which the shut-off passageway 124 opens at its upper end 142. A peripheral stepped wall 143 may extend upward from the floor 140 of the upper portion 123 to define an upwardly opening recess 144. The outer peripheral surface of an upper portion 145 of the stepped wall 143 may be provided with screw threads 146 that, in use, threadingly engage with mating screw threads 147 provided on an upper portion of the inner wall surface of the header housing 30.

The outer wall of upper portion 123 of end cap 120, positioned adjacent the step and below the screw threads 146, may be provided with a peripheral groove 148 that supports an O-ring 149. This arrangement, together with O-ring 138, may serve to form a fluid tight seal to filtrate discharge passageway 126.

Shut-off passageway 124 may provide access from the exterior of header housing 30 to the interior of the filtrate discharge passageway 126 and house a shut-off valve 150. Shut-off valve 150 may also be referred to simply as valve 150. A top portion 151 of shut-off valve 150 may comprise an aperture (not shown) for receiving an adjustment tool, for example, a screwdriver or wrench and for manual activation of the valve. In accordance with some embodiments, shut-off valve 150 may be activated manually. In accordance with other embodiments, shut-off valve 150 may be remotely activated by a control system. For example, a control system may remotely control a servo motor which may operate the shut-off valve 150. Adjacent the central portion of shut-off valve 150 may be a seal 152 that provides a fluid-tight seal between the shut-off valve 150 and the interior wall of shut-off passageway 124.

Port 154 in end cap 120 may fluidly connect filtrate collection chamber 135 and filtrate passageway 126. At the lower end of shut-off valve 150 there may be a seal 153. When the shut-off valve 150 is moved upwardly, seal 153 may close port 154 to the filtrate discharge passageway 126 to prevent flow of filtrate from the sub-module 16 to the header 155. The closing of port 154 does not interfere with the flow of filtrate to and from adjacent headers through filtrate passageway 126. Shut-off valve 150 may be constructed so that it may be readily operated without dismantling any component parts of the filter. Shut-off valve 150 may advantageously allow a single membrane module of a filtration system comprising a plurality of modules to be taken offline without requiring other surrounding modules to be taken offline at the same time.

Shut-off valve 150 may comprise a shaft 156 that protrudes from the upper portion of end cap 120 when activated. The protrusion of the shaft may be easily ascertainable at a distance. In certain embodiments, the protruding shaft may indicate that shut-off valve 150 is in the closed position and therefore indicate that the respective sub-module is disconnected or offline.

In certain embodiments, an inner wall of shut-off passageway 124 and shaft 156 may comprise complimentary mating structures configured to selectively allow fluid communication between port 154 and filtrate passageway 124. For example, in accordance with some embodiments, shut-off valve 150 may be moved from the open position to the closed position by rotating shaft 156 of valve 150 in a screw threading engagement with the inner wall of shut-off passageway 124. Rotating shaft 156 in passageway 124 in a first direction may cause upward axial movement of seal 153 and close port 154. Likewise, rotating shaft 156 in a second direction may cause downward axial movement of seal 153 and open port 154.

In certain embodiments, shut-off passageway 124 may have a viewing window or be formed of transparent material so that air bubbles can be observed by an operator during a pressure test or pressure decay test. An air pressure decay test may comprise pressurizing one side of a hollow fiber membrane module, and then watching the air pressure decay over a period of time, which may be several minutes. If the membrane fibers in the module are intact, a change in pressure over time corresponding to the pressure decay may be low or unchanging. If one or more membrane fibers in the module are broken, the pressure may decay at a high or highly unstable rate. In certain instances, hollow fiber membranes in filtration systems undergo automatic air pressure tests. The procedure may be conducted on an entire rack of modules at one time and in certain cases, be capable of finding one broken fiber in an entire array of modules. Air pressure decay tests may be also performed manually. The test may be performed on a regular or sporadic basis.

The upper component 87 of header housing 30 may be provided with a filtrate transfer port 160 located in a side wall of upper component 87 adjacent to and extending from the filtrate discharge passageway. Filtrate transfer port 160 may be provided with a radially protruding tubular connection flange 161 at its free end 162. Around the periphery of the tubular connection flange 161 there may be a pair of annular grooves 163 and 164 that support O-rings 165 and 166.

Connection flange 161 of filtrate transfer port 160 may fit within and provide a seal with a connection flange 167 provided on a common filtrate transfer manifold 168. The common filtrate transfer manifold 168 may be located between the upper headers 155 of each module 11, 12.

Similarly, the radially protruding connection flange 106 of fluid transfer port 105 may fit within and provide a seal with a connection flange 169 provided on a common fluid transfer manifold 170 located between upper headers 155 of each module 11, 12. The O-rings 110, 111 may provide a sealing engagement with the mating connecting flange 169 of the fluid transfer manifold 170.

Figure 2:
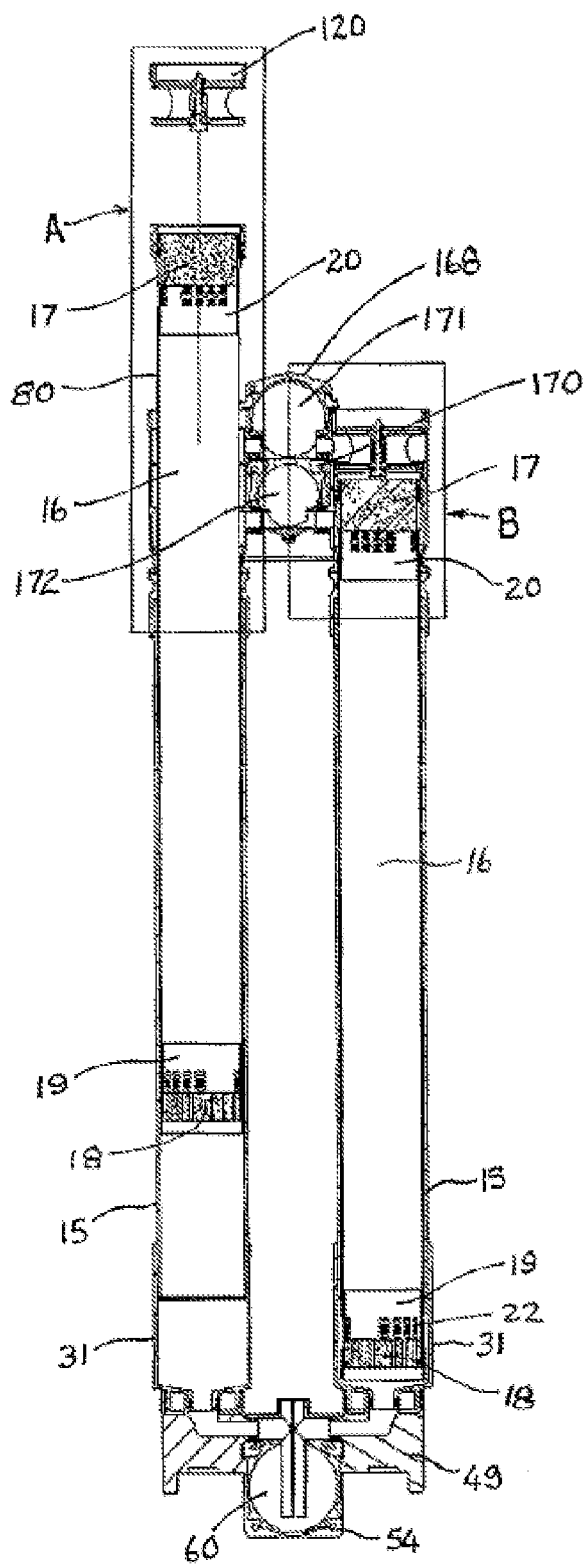
FIG. 2 is a schematic of a partially exploded, cross-sectional elevation view of the pair of membrane modules of FIG. 1.
Figure 3:
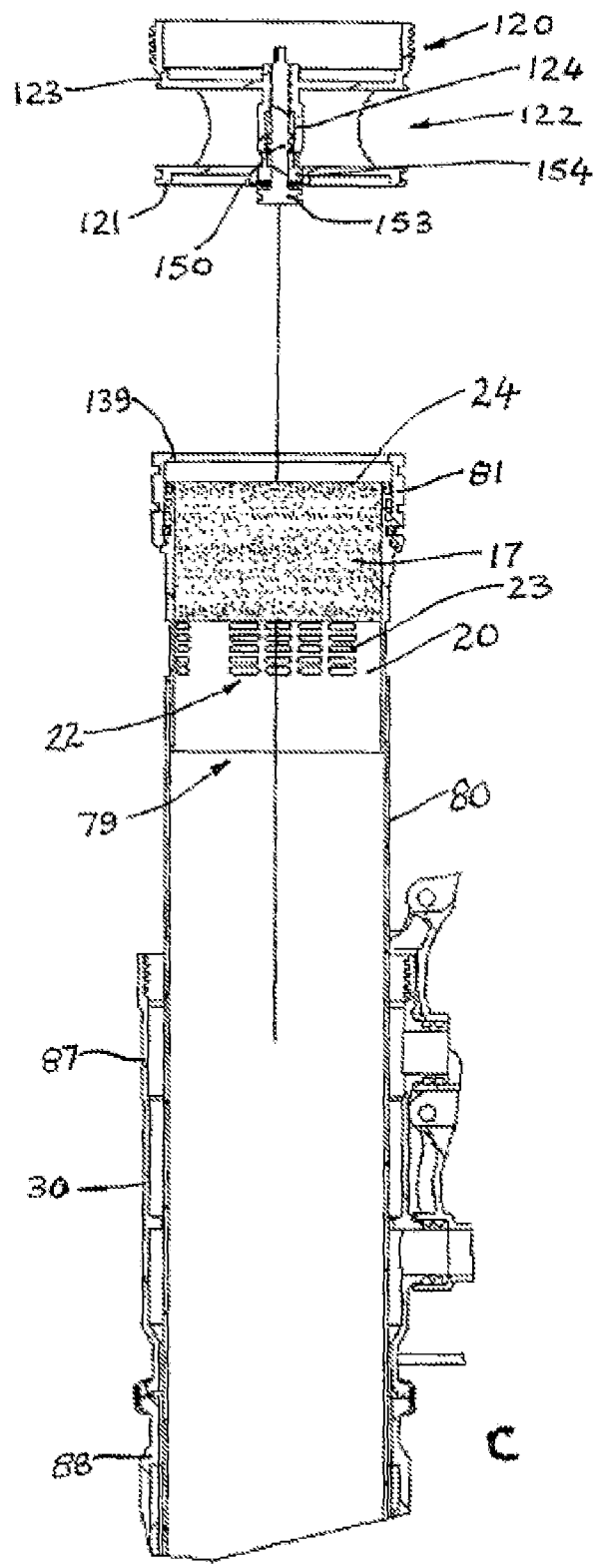
FIG. 3 is an enlarged schematic of a partially exploded, cross-sectional elevation view of region A of FIG. 2.

As best shown in FIGS. 1 and 2, the fluid transfer manifold 170 and the filtrate transfer manifold 168 may each be provided with a respective generally circular cross-section passageway 171, 172 extending normal to the longitudinal axis of modules 11, 12. The filtrate transfer manifold 168 may be mounted to and positioned above the fluid transfer manifold 170. The manifolds 168, 170 may be mounted between the upper header housings 30 of each module pair 11, 12 so as not to obstruct the removal of the respective end caps 120 of each header housing 30.

Figure 5:
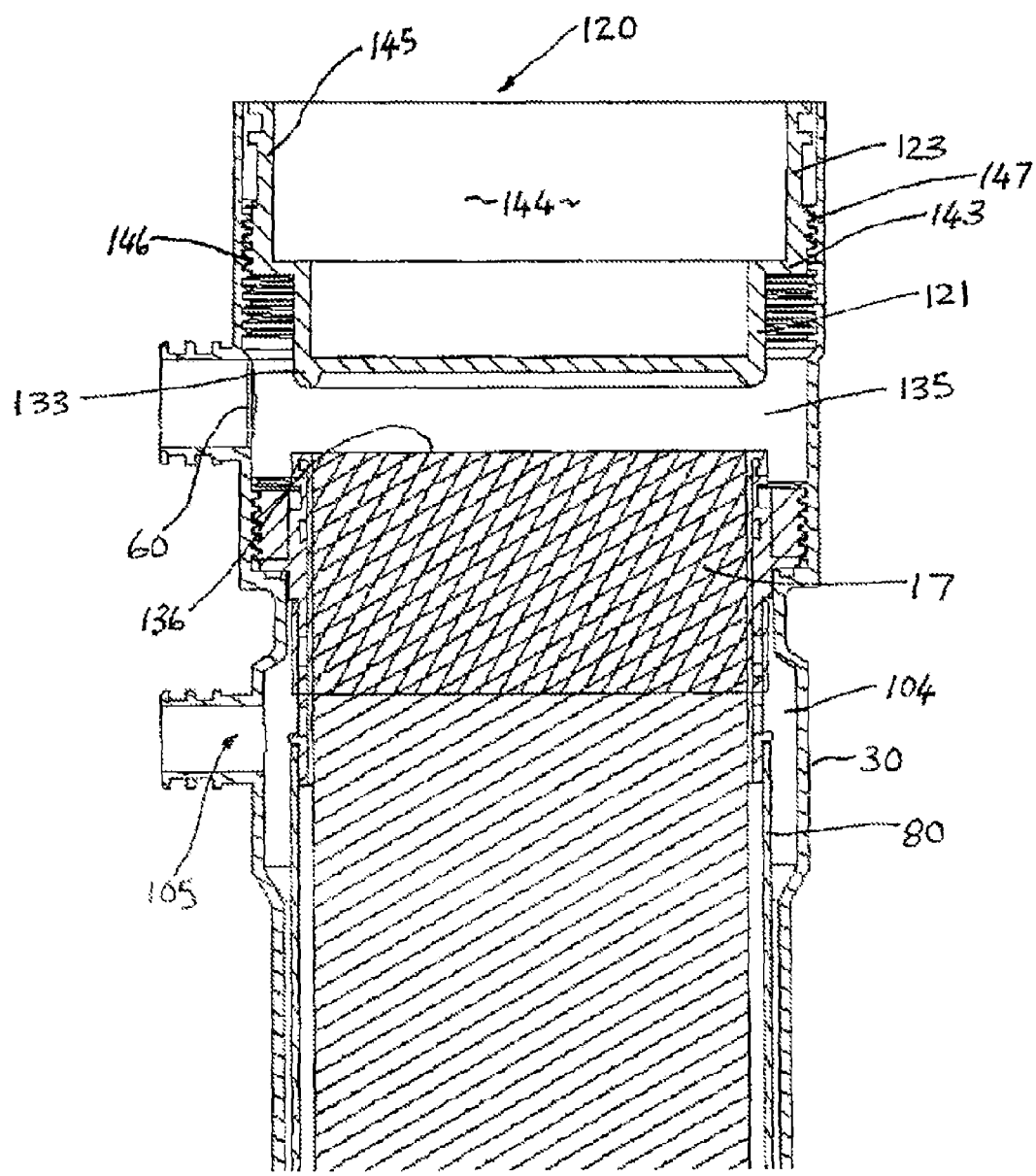
FIG. 5 is an enlarged cross-sectional elevation view of an upper header housing with an end cap in an open position in accordance with one or more aspects of the disclosure.
Figure 6:
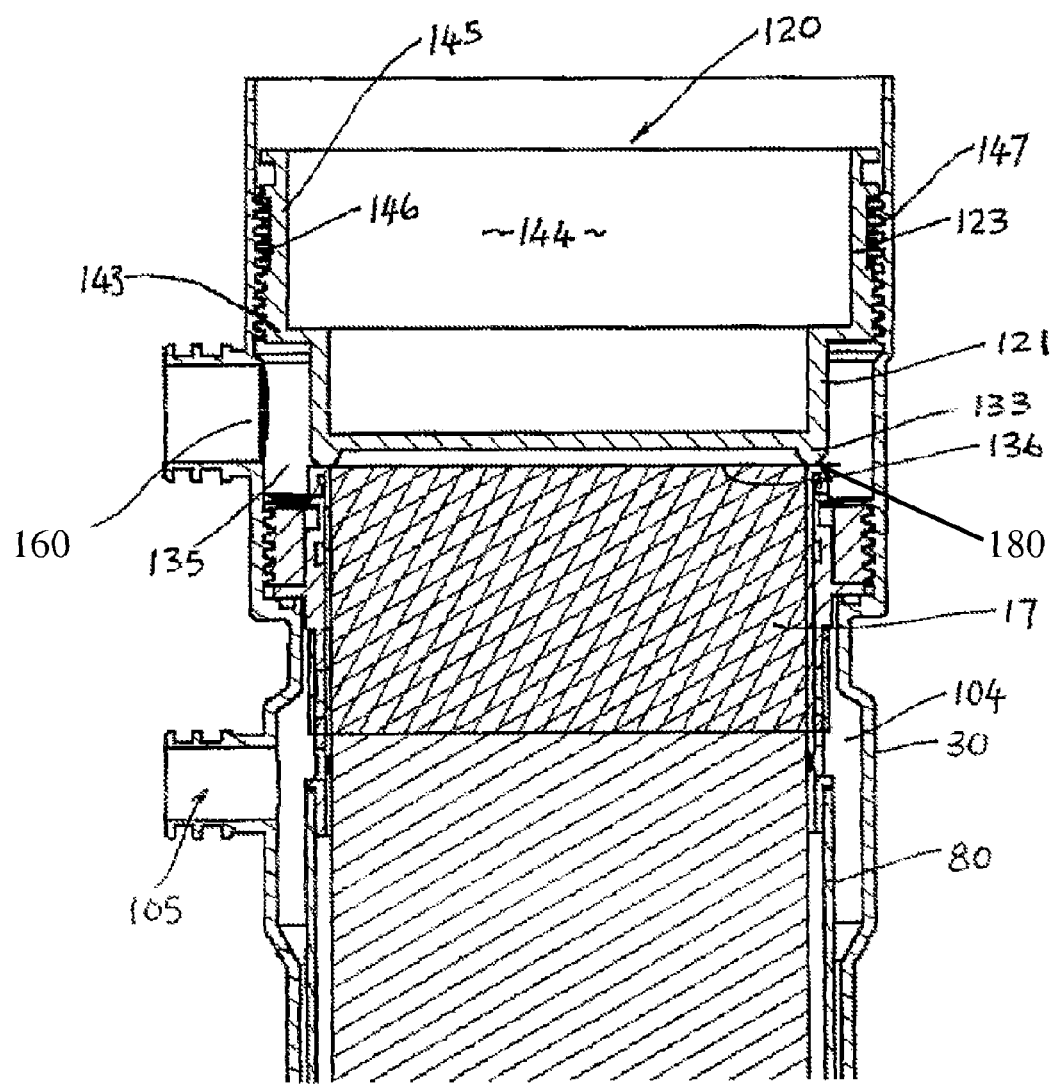
FIG. 6 is an enlarged cross-sectional elevation view of the upper header housing of FIG. 5 with the end cap in a closed position.

FIGS. 5 and 6 illustrate a further embodiment of an end cap and header housing arrangement in accordance with various aspects and embodiments described herein. In the figures, the end cap and header housing are configured to provide an alternate method and structure for isolating a filtrate collection chamber. In certain embodiments, isolating a filtrate collection chamber may occur when a fault is detected in the relevant filtration module.

In this embodiment, shut-off valve 150 and the internal filtrate passageway of the end cap may no longer be required.

The end cap 120 may comprise an upper portion 123 and a reduced diameter base portion 121 formed by a stepped wall 143. Stepped wall 143 may define an upwardly opening downwardly extending recess 144 in the end cap 120. Upper portion 145 of stepped wall 143 may be provided with a peripheral circumferentially extending screw thread 146 that engages with a mating screw thread 147 on the internal wall of the upper header housing 30. Base portion 121 may comprise a circumferential downwardly extending rib 133 that, in use, may bear against an upper peripheral edge 134 of annular adaptor 81.

In use, end cap 120 may be screwed down within header housing 30 to a position where base portion 121 is spaced vertically from the upper surface 136 of the upper potting head 17 to form a filtrate receiving chamber 135. Filtrate receiving chamber 135 may be in direct fluid communication with filtrate transfer port 160.

When a fault in the filtration module is detected, it may be desirable to isolate the module. As illustrated in FIG. 6, end cap 120 may be screwed further downward within header housing 30 until the rib 133 bears against an upper peripheral edge 180 of the upper potting sleeve 20. This may function to seal off the upper surface 136 of upper potting head 17 from the filtrate transfer port 160 and prevent flow of filtrate to filtrate transfer port 160. Rib 133 may be formed of a sealing material to produce a fluid tight seal, or a groove may be formed in the rib to accommodate a sealing O-ring (not shown).

Figure 7:
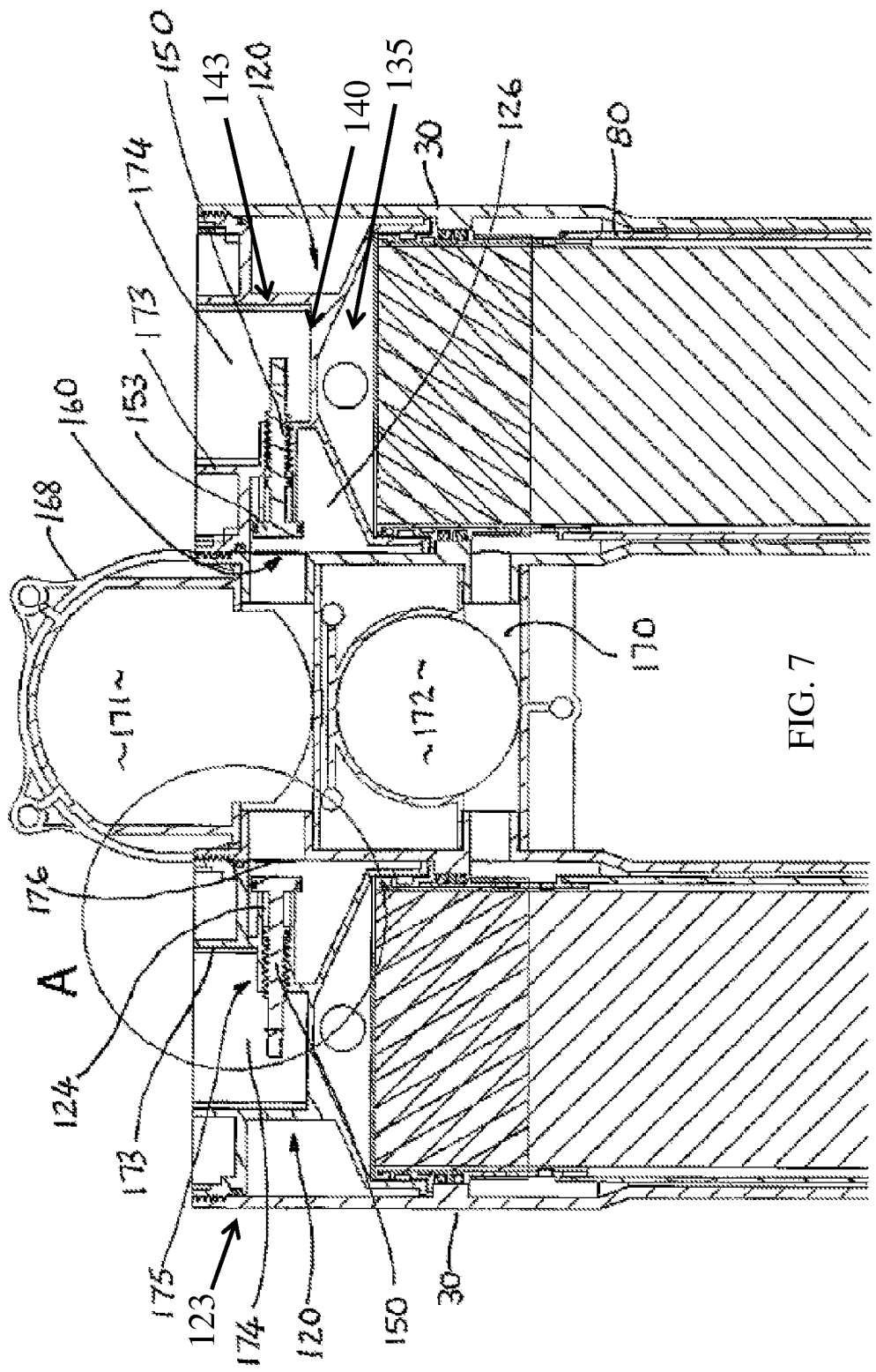
FIG. 7 is a cross-sectional elevation view of an upper portion of a pair of filtration modules in accordance with one or more aspects of the disclosure.
Figure 8:
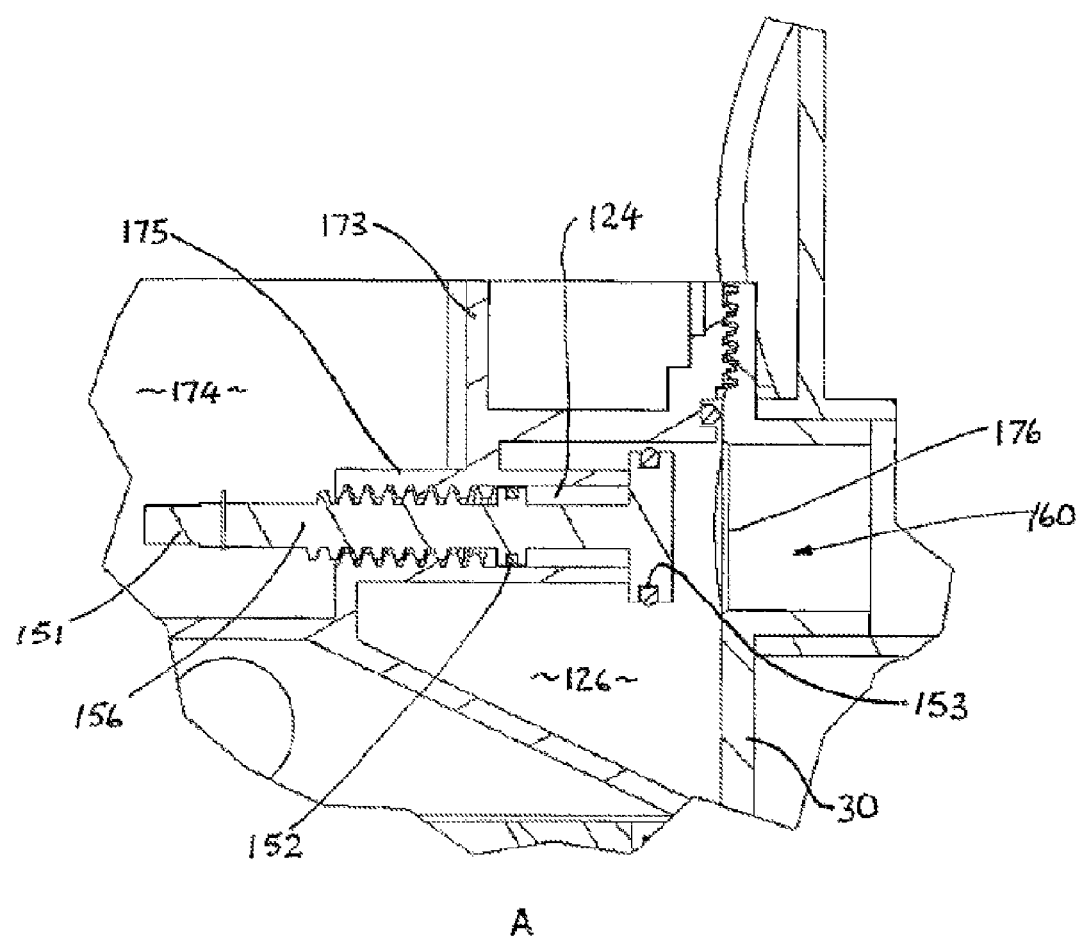
FIG. 8 is an enlarged schematic of a cross-sectional elevation view of region A of FIG. 7.

FIGS. 7 and 8 illustrate a further embodiment of an end cap 120 and header housing arrangement in accordance with various aspects and embodiments described herein. In the figures, the end cap and header housing may be configured to provide an alternate method and structure for isolating the filtrate receiving chamber 135, for example, when a fault is detected in the relevant filtration module.

In this embodiment, the end cap 120 may be configured differently to the embodiments described above. A further stepped wall 173 spaced radially inward of stepped wall 143 may extend upwardly from the floor 140 of upper portion 123 of end cap 120 to define an upwardly opening recess 174. The upper portion of the end cap 120 may be provided with a radially extending shut-off passageway 124 that is located adjacent a step portion 175 of stepped wall 173. Shut-off passageway 124 may extend from recess 174 to filtrate passageway 126.

Shut-off passageway 124 may provide access from the exterior of the header housing 30 to the interior of the filtrate discharge passageway 126 and house a shut-off valve 150. The inner portion 151 of shut-off valve 150 may comprise an aperture (not shown) for receiving an adjustment tool, for example, a screwdriver or wrench and for manual activation of valve 150. Adjacent the central portion of the shut-off valve 150 may be a seal 152 that provides a fluid-tight seal between shut-off valve 150 and shut-off passageway 124.

At the outer end of shut-off valve 150 may be a seal 153. When shut-off valve 150 is moved outwardly, seal 153 may function to close port 176 off from filtrate discharge passageway 126 and filtrate transfer port 160 and prevent flow of filtrate from cartridge 16 to header 155. It is to be noted, however, that closure of port 176 may not interfere with the flow of filtrate to and from adjacent headers through filtrate passageway 126. Shut-off valve 150 may be so designed that it can be readily operated without dismantling of component parts of the filter.

Shut-off valve 150 may be moved from the open position to the closed position by rotating shaft 156 of the valve 150 in a screw threading engagement with the inner wall of the shut-off passageway 124, resulting in outward axial movement relative to the shut-off passageway 124. Subsequently, port 176 may be closed using seal 153 positioned on the end of shaft 156. Shut-off valve 150 may be opened by rotating shaft 156 in an opposite direction.

The operation of the filtration modules will now be generally described with reference to FIGS. 1 to 5.

As described in co-owned Australian Patent Application No. 2010902334, which is incorporated herein by reference in its entirety for all purposes, during the normal feed supply mode and during filtration, the feed passageway 60 of the lower header 32 may be filled with feed liquid. Feed may flow through feed passageway 60 into the fluid connection passageway 50 and out of the fluid transfer port 45 of the lower header 32. The feed liquid may then flow into the lower socket 31 along annular fluid transfer passageway 9 through the fluid communication region 21, the openings 22 in the lower potting sleeve 19, and around the membranes of each module 11 and 12.

The filtration system of this embodiment may operate in a dead-end filtration mode or a feed and bleed filtration mode.

In dead-end filtration mode, the feed liquid may be pressurised within the outer casing 15 to produce a transmembrane pressure differential across the walls of the membranes. This may result in filtrate being produced within the membrane lumens. In this embodiment, the membranes may not open into the lower potting head 18. Therefore, filtrate may flow upward within the membrane lumens and be discharged into the filtrate receiving chamber 135. The filtrate may then flow through port 154, filtrate discharge passageway 126, filtrate transfer port 160, and into filtrate transfer manifold 168.

In feed and bleed filtration mode, a portion of feed liquid (for example, 10% to 75% of the feed liquid) entering the base of each module may flow upward along the membranes and within the solid screen and outer casing 15 and pass outward through openings 22 in the upper potting sleeve 20 into annular fluid transfer passageway 104. The feed liquid may then flow out through fluid transfer port 105 and into the passageway 172 of the fluid transfer manifold 170.

In this embodiment the membranes may not open into the lower potting head 18, so filtrate may flow upward within the membrane lumens and be discharged into the filtrate receiving chamber 135. The filtrate may then flow through port 154, filtrate discharge passageway 126, filtrate transfer port 160, and into filtrate transfer manifold 168.

As described in co-owned Australian Patent Application No. 2010902334, when air or gas scouring is desired, the liquid within the feed passageway 60 may be displaced downwardly by the introduction of gas into the feed passageway 60. The gas may be fed upwardly through passages 26 in the lower potting head 18 and then around the membranes.

The gas may then enter the base of each module 11, 12 and flow upward as bubbles along the membranes and within the solid screen 80 to clean the surface of the membranes. The gas may then pass out through openings 22 in the upper potting sleeve 20 into annular fluid transfer passageway 104. The gas may then vent through fluid transfer port 105 and into the passageway 171 of the fluid transfer manifold 170.

During a backwash or a draindown after gas aeration or scouring, liquid may be removed from the module by flowing liquid from the module in a reverse direction to the feed supply mode.

The methods and systems described herein are not limited in their application to the details of construction and the arrangement of components set forth in the previous description or illustrations in the figures. The methods and systems described herein are capable of other embodiments and of being practiced or of being carried out in various ways. Also, the phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, as well as alternate embodiments consisting of the items listed thereafter exclusively.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

Those skilled in the art would readily appreciate that the various parameters and configurations described herein are meant to be exemplary and that actual parameters and configurations will depend upon the specific application for which the apparatus and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a heat exchanger system or water treatment system. It is, therefore, to be understood that the foregoing embodiments are presented by way of example only and that, within the scope of the appended claims and equivalents thereto, the disclosed systems and methods may be practiced otherwise than as specifically described. For example, flat sheet membranes may be prepared and used in the systems of the present disclosure. The present systems and methods are directed to each individual feature, system, or method described herein. In addition, any combination of two or more such features, systems, or methods, if such features, systems or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, the manifolds may be prepared by any fabrication technique, including injection molding or welding techniques and be fabricated from any desired material. In other instances, an existing facility may be modified to utilize or incorporate any one or more aspects of the methods and systems described herein. Thus, in some cases, the systems may involve connecting or configuring an existing facility to comprise a filtration system or components of a filtration system, for example, the manifolds disclosed herein. Accordingly, the foregoing description and figures are by way of example only. Further, the depictions in the figures do not limit the disclosures to the particularly illustrated representations.

While exemplary embodiments of the disclosure have been disclosed, many modifications, additions, and deletions may be made therein without departing from the spirit and scope of the disclosure and its equivalents, as set forth in the following claims.

What is claimed is:

1. A membrane filtration system comprising:
   a first filtration module including a plurality of hollow fiber membranes, the plurality of hollow fiber membranes potted in and extending between an upper potting head of an upper header and a lower potting head of a lower header; and
   a removable end cap configured to seal with the upper header and allow selective communication between the first filtration module and a filtrate outlet, the removable end cap comprising:
   an upper portion;
   a base portion;
   a reduced diameter mid portion that at least partially defines a first filtrate passageway in selective communication with the plurality of hollow fiber membranes, the reduced diameter mid portion extending between the upper portion and the base portion, an upper wall of the first filtrate passageway separating the reduced diameter mid portion from the upper portion, a lower wall of the first filtrate passageway separating the reduced diameter mid portion from the base portion, the reduced diameter mid portion defined in part by a concave wall disposed within an interior of the first filtrate passageway, the concave wall coupled to the upper wall and to the lower wall and having a width in a direction normal to an extending direction of the plurality of hollow fiber membranes, the width having a first value where the concave wall is coupled to the upper wall and to the lower wall and a second value that is less than the first value at an approximate mid-point portion of the concave wall in between the upper wall and the lower wall;

a port formed in the base portion of the end cap; and a shut-off valve including a seal configured to selectively allow fluid communication between the port and the first filtrate passageway.

2. The membrane filtration system of claim 1, further comprising a plurality of filtration modules including respective upper headers with removable end caps having respective first filtrate passageways.

3. The membrane filtration system of claim 2, further comprising a filtrate transfer manifold in fluid communication with the first filtrate passageways in the removable end caps of the upper headers of the plurality of filtration modules.

4. The membrane filtration system of claim 3, wherein the shut-off valve is configured to isolate the plurality of hollow fiber membranes from the first filtrate passageway while the first filtrate passageway provides fluid communication between the first filtrate passageways in the removable end caps of the upper headers of the plurality of filtration modules.

5. The membrane filtration system of claim 3, wherein the shut-off valve further comprises a shaft that protrudes through the removable end cap.

6. The membrane filtration system of claim 5, wherein the shut-off valve is disposed within a shut-off passageway in fluid communication with the first filtrate passageway.

7. The membrane filtration system of claim 6, wherein an inner wall of the shut-off passageway and the shaft of the valve comprise complimentary mating structures configured to provide for displacement of the valve in the shut-off passageway and selectively allow fluid communication between the port and the filtrate passageway.

8. The membrane filtration system of claim 6, wherein the shut-off passageway comprises a viewing window.

9. The membrane filtration system of claim 1, wherein the shut-off valve is configured to allow manual positioning of the seal.

10. The membrane filtration system of claim 1, further comprising a filtrate receiving chamber in fluid communication with the first filtrate passageway and the port, the filtrate receiving chamber positioned between the port and the plurality of hollow fiber membranes.

11. The membrane filtration system of claim 10, further comprising a filtrate transfer manifold and a filtrate transfer port, the filtrate transfer port positioned in fluid communication between the filtrate transfer manifold and the filtrate receiving chamber.

12. The membrane filtration system of claim 1, further comprising a control system configured to compare a measured value of at least one operating parameter of the filtration module against a target value or range of values and, responsive to the measured value failing to meet the target value or range of values, automatically engage the shut-off valve and halt flow of filtrate through the filtration module.

13. The membrane filtration system of claim 12, further comprising a sensor in communication with the control system, the sensor configured to measure the at least one operating parameter of the filtration module.

14. The membrane filtration system of claim 1, wherein the end cap further comprises a centrally located shut-off passageway extending from the upper portion to a lower side of the base portion.

15. The membrane filtration system of claim 1, wherein the first filtrate passageway includes a number of radially extending reinforcement ribs that extend between the upper and lower walls of the first filtrate passageway.

* * * * *